United States Patent

Nakayama et al.

[15] 3,671,396
[45] June 20, 1972

[54] PREPARATION OF L-ISOLEUCINE BY FERMENTATION

[72] Inventors: Kiyoshi Nakayama, Sagamihara-shi; Hiroshi Hagino, Hachioji-shi, both of Japan

[73] Assignee: Kyowa Hakko Kogyo Kabushiki Kaisha, Tokyo-to, Japan

[22] Filed: March 5, 1969

[21] Appl. No.: 804,696

[30] Foreign Application Priority Data

March 13, 1968 Japan.....................................43/15903

[52] U.S. Cl. ...........................................................195/28 R
[51] Int. Cl. ........................................................C12d 13/06
[58] Field of Search..........................195/3 H, 28, 30, 41–70, 195/29

[56] References Cited

UNITED STATES PATENTS 3,058,888  10/1962  Chibata et al............................195/30
3,219,543  11/1965  Douros et al............................195/3 X
3,222,258  12/1965  Iizuka et al.............................195/3 X

OTHER PUBLICATIONS

Ajinomoto Co., " Prep. of Isoleucine by Fermentation," Chem. Abs., Vol. 63, 1965, No. 3590.
Otsuka et al., J. Gen. Appl. Microbiol, Vol. 12, p. 1– 11, 1966.
Wada, H., " Isoleucine," Chem. Abs., Vol. 64, No. 4229, 1966.
Yamada et al., Agr. Biol. Chem. Vol. 27, pp. 390– 395, 1963.

*Primary Examiner*—A. Louis Monacell
*Assistant Examiner*—Gary M. Nath
*Attorney*—Bacon & Thomas

[57] ABSTRACT

L-isoleucine is prepared by culturing a hydrocarbon assimilable microorganism in a culture medium containing hydrocarbon as the main carbon source and $\alpha$-aminobutyric acid, hydroxybutyric acid, threonine or mixtures thereof or nontoxic salts thereof. Microorganisms of the genera Corynebacterium, Brevibacterium, Arthrobacter, Micrococcus, Pseudomonas, Nocardia, Streptomyces, etc., are particularly suitable for use in the process.

13 Claims, No Drawings 3,671,396

PREPARATION OF L-ISOLEUCINE BY FERMENTATION

BACKGROUND OF THE INVENTION

L-isoleucine is an essential amino acid and is useful as a nutrient for humans and animals. It is possible, for example, to improve the nutritional value of proteins by addition of L-isoleucine.

Prior investigators have reported that L-isoleucine can be obtained by fermentation by employing a culture medium mainly containing saccharides. Additionally, the substitution of less expensive hydrocarbons for saccharides has been reported [U.S. Pat. No. 3,222,258] but only small amounts of L-isoleucine were reported as being accumulated in the culture medium [about 2.2 mg/l according to the examples of U.S. Pat. No. 3,222,258]. The reported processes, therefore, are not well suited for the commercial production of L-isoleucine.

DETAILED DESCRIPTION OF THE INVENTION

We have discovered that L-isoleucine can be obtained in large yield by culturing a hydrocarbon assimilable microorganism in a culture medium containing hydrocarbon as the main carbon source and, in addition, α-aminobutyric acid, hydroxybutyric acid, threonine or mixtures thereof or non-toxic salts thereof.

Any hydrocarbon assimilable microorganism capable of producing L-isoleucine may be used for the purpose of the present invention. Microorganisms capable of producing L-isoleucine according to the process of this invention are found in various genera but particularly suitable microorganisms are members of the genera Corynebacterium, Brevibacterium, Arthrobacter, Micrococcus, Pseudomonas, Candida, Nocardia, Streptomyces, etc.

The action and function of α-aminobutyric acid, α-hydroxybutyric acid, acid, threonine or mixtures thereof is not sufficiently known to determine whether they act as substrates for the preparation of L-isoleucine. Even if they do act as a substrates, the present invention provides the use of cheaper hydrocarbon sources than those conventionally employed for the same purpose and, accordingly, provides a process more easily adopted for commercial use.

The effect of the addition of α-aminobutyric acid on a hydrocarbon-containing culture medium with respect to L-isoleucine fermentation was determined by using an L-isoleucine-producing strain belonging to the genus Corynebacterium hydrocarboclastus. α-Aminobutyric acid in an amount shown in Table 1 was added to 10 ml each of a culture medium containing an n-alkane mixture ($C_{11}$–$C_{14}$) (2 g/dl), $NH_4Cl$ (0.34 g/dl), $KH_2PO_4$ (0.16 g/dl), $MgSO_4 \cdot 7H_2O$ (0.05 g/dl), NaCl (0.2 g/dl), thiamine hydrochloride (50 mg/l) and having a pH of 7.2.

After the α-aminobutyric acid was placed in the culture media, the media were each placed in 250 ml Erlenmeyer flasks. The media were sterilized at 115° C. for 10 minutes. Each medium was then innoculated with the aforementioned strain and cultured at 30° C. for 96 hours with shaking (230 r.p.m.) by using a conventional shaker to produce the quantity of L-isoleucine shown in Table 1. From this table, it is apparent that the accumulation of L-isoleucine is largely increased by addition of α-aminobutyric acid.

The amount of α-aminobutyric acid added to any given culture medium will vary depending upon the type of microorganism employed, the composition of the medium and the concentration thereof, etc., but it is preferred to use 0.5–50g/l.

Similar effects to those disclosed in Table 1 were also found when α-hydroxybutyric acid, threonine or mixtures thereof were added to the culture medium.

Any synthetic or natural medium containing α-aminobutyric acid, α-hydroxybutyric acid, threonine or mixtures thereof or non-toxic salts thereof and suitable amounts of assimilable hydrocarbon as the main carbon source, nitrogen source, inorganic substances and other nutrients necessary for the growth of the microorganism employed may be used for the purpose of this invention.

As the hydrocarbon source in the culture medium, various assimilable hydrocarbon sources such as kerosene, gasoline, heavy oil, butane, naptha, ligroin, natural gas, propane, ethane, methane, etc., may be used.

As the nitrogen source, both organic and inorganic nitrogen compounds, such as urea, nitrates, ammonia and ammonium salts, e.g., ammonium sulfate, ammonium chloride, ammonium nitrate, ammonium carbonate, ammonium acetate, etc., may be used. Various other nitrogen-containing substances may also be used as well as peptone, meat extract, yeast extract, corn steep liquor, casein hydrolysate, fish meal, soybean meal, etc. These may be used solely or in combination with other substances.

As the inorganic substances which may be included in the culture medium, there may be mentioned $K_2HPO_4$, $KH_2PO_4$, magnesium sulfate, zinc sulfate, manganese sulfate, calcium carbonate, etc.

In addition, vitamins, amino acids and bases, etc., may be added to the culture medium according to characteristics of the microorganisms employed.

The fermentation should be carried out under aerobic conditions such as by means of aeration, shaking, etc. The culturing temperature is preferably 20° to 40° C. The pH of the medium may vary but it is advantageous to adjust the pH to about neutral with acid or alkali.

The following examples serve to illustrate the invention, but they are not to be considered as limiting the same:

EXAMPLE 1

Fermentation was carried out using a culture medium containing an n-alkane mixture ($C_{11}$–$C_{14}$) (1 g/dl), $(NH_4)_2SO_4$ (2g/dl), $KH_2PO_4$ (0.2 g/dl), $NaHPO_4$ (0.2 g/dl). $MgSO_4 \cdot 7H_2O$ (0.1 g/dl), $FeSO_4 \cdot 7H_2O$ (0.001 g/dl), $MnSO_4 \cdot 4H_2O$ (0.001 g/dl). $ZnSO_4 \cdot 2H_2O$ (0.001 g/dl), thiamine (1 mg/l), yeast extract (0.3 g/dl) $CaCO_3$ (2 g/dl) and DL-α-aminobutyric acid (10mg/ml) and having a pH of 7.4. Ten ml portions portions of the media were separately placed in large test tubes and each inoculated with one of the microorganisms shown in Table 2. Fermentation was carried out with shaking at 30° C. for 96 hours to obtain the quantity of L-isoleucine shown in Table 2. Under similar culture conditions but in the absence of DL-α-aminobutyric acid, no substantial quantity of L-isoleucine was accumulated except with Corynebacterium hydrocarboclastus (ATCC 15592) (50 mg/l).

The accumulated L-isoleucine was recovered by using ion exchange resin in known manner.

TABLE I

| α-Aminobutyric acid added (mg/ml) | Amount of L-isoleucine Accumulated (mg/ml) |
| --- | --- |
| 0 | <10 |
| 1 | 200 |
| 10 | 4600 |
| 30 | 4700 |

TABLE 2

| Microorganism | Amount of L-isoleucine Produced (g/l) |
| --- | --- |
| Arthrobacter hydrocarboglutamicus (ATCC 15583) | 1.00 |
| Micrococcus paraffinoliticus (ATCC 15582) | 1.55 |
| Corynebacterium hydrocarboclastus (ATCC 15592) | 1.50 |
| Pseudomonas aeruginosa | |

| Microorganism | |
|---|---|
| (ATCC 7700) | 0.10 |
| *Pseudomonas Vendoreli* (IFO 3899) | 0.05 |
| *Candida tropicalis* (IAM 4924) | 0.40 |
| *Candida lipolytica* (IFO 0746) | 0.10 |
| *Nocardia globerula* (ATCC 21022) | 0.20 |
| *Streptomyces antibioticus* (ATCC 10382) | 0.30 |

EXAMPLE 2

Microorganisms shown in Table 3 were cultured in a manner similar to that d described in Example 1 with the exception that DL-α-hydroxybutyric acid (5 mg/ml) was used in place of α-aminobutyric acid. The results obtained are shown in Table 3.

TABLE 3

| Microorganism | Amount of L-isoleucine Produced (g/l) |
|---|---|
| *Micrococcus paraffinoliticus* (ATCC 15582) | 0.50 |
| *Micrococcus paraffineus* (ATCC 15589) | 0.25 |
| *Corynebacterium hydrocarboclastus* (ATCC 15592) | 0.75 |
| *Nocardia globerula* (ATCC 21022) | 0.30 |

Cultivation similar to that described above was performed without adding α-hydroxyburyric acid to the media. No substantial quantity of L-isoleucine was accumulated except with *Corynebacterium hydrocarboclastus* (ATCC 15592) (50 mg/l).

EXAMPLE 3

Cultivation similar to that described in Example 1 was employed using the microorganisms shown in Table 4 with the exception that D-threonine (5 mg/ml) was substituted for D,L-α-aminobutyric acid. Cultivation similar ro that described above was performed without adding D-threonine to the media. No. substantial quantity of L-isoleucine was accumulated except with *Corynebacterium hydrocarboclastus* (ATCC 15592) (50 mg/l).

TABLE 4

| Microorganism | Amount of L-isoleucine Produced (g/l) |
|---|---|
| *Arthrobacter hydrocarboglutamicus* (ATCC 15583) | 0.15 |
| *Micrococcus paraffinoliticus* (ATCC 15582) | 0.25 |
| *Corynebacterium hydrocarboclastus* (ATCC 15592) | 0.25 |
| *Pseudomonas Vendoreli* (IFO 3899) | 0.10 |

EXAMPLE 4

Microorganisms shown in Table 5 were cultured in a manner similar to that described in Example 1 with the exception that L-threonine (10 mg/ml) was substituted for α-aminobutyric acid to give the results shown in Table 5. Cultivation similar to that described above was performed without addition of L-threonine to the media. No substantial quantity of L-isoleucine was accumulated except with *Corynebacterium hydrocarboclastus* (ATCC 15592) (50 mg/l).

TABLE 5

| Microorganism | Amount of L-isoleucine Produced (g/l) |
|---|---|
| *Arthrobacter hydrocarboglutamicus* (ATCC 15583) | 0.25 |
| *Micrococcus paraffinoliticus* (ATCC 15582) | 0.25 |
| *Corynebacterium hydrocarboclastus* (ATCC 15592) | 0.30 |
| *Pseudomonas Vendoreli* (IFO 3899) | 0.10 |
| *Nocardia globerula* (ATCC 21022) | 0.10 |
| *Brevibacterium ketoglutamicum* (ATCC 15587) | 0.20 |

A culture of each organism identified by ATCC (American Type Culture Collection), IAM (Institute of Applied Microbiology, Tokyo University, Tokyo, Japan) number or IFO (Institute for Fermentation, Osaka, Japan) has been deposited without restriction as to its being made available to the public at the identified depository.

We claim:

1. A process of preparing L-isoleucine by fermentation, comprising aerobically culturing a hydrocarbon-assimilable microorganism selected from the group consisting of *Arthrobacter hydrocarboglutamicus* ATCC 15583, *Micrococcus paraffinoliticus* ATCC 15582, *Micrococcus paraffineus* ATCC 15589, *Corynebacterium hydrocarboclastus* ATCC 15592, *Pseudomonas aeruginosa* ATCC 7700, *Pseudomonas vendoreli* IFO 3899, *Nocardia globerula* ATCC 21022, *Streptomyces antibioticus* ATCC 10382 and *Brevibacterium ketoglutamicum* ATCC 15587 in a culture medium containing hydrocarbon as the main carbon source and α-aminobutyric acid, α-hydroxybutyric acid, threonine or mixtures thereof or non-toxic salts thereof and recovering the accumulated L-isoleucine from said culture medium.

2. A process as claimed in claim 1 in which the temperature of said culture medium is maintained within the range of 20°–40 C.

3. A process as claimed in claim 1 in which the pH of said culture medium is maintained at approximately 7.

4. A process as claimed in claim 1 in which said culture medium contains a nitrogen source, inorganic material and nutrients.

5. A process as claimed in claim 1 in which the microorganism is *Arthrobacter hydrocarboglutamicus* ATCC 15583.

6. A process as claimed in claim 1 in which the microorganism is *Micrococcus paraffinoliticus* ATCC 15582.

7. A process as claimed in claim 1 in which the microorganism is *Micrococcus paraffineus* ATCC 15589.

8. A process as claimed in claim 1 in which the microorganism is *Corynebacterium hydrocarboclastus* ATCC 15592.

9. A process as claimed in claim 1 in which the microorganism is *Pseudomonas aeruginosa* ATCC 7700.

10. A process as claimed in claim 1 in which the microorganism is *Pseudomonas vendoreli* IFO 3899.

11. A process as claimed in claim 1 in which the microorganism is *Nocardia globerula* ATCC 21022.

12. A process as claimed in claim 1 in which the microorganism is *Streptomyces antibioticus* ATCC 10382.

13. A process as claimed in claim 1 in which the microorganism is *Brevibacterium ketoglutamicum* ATCC 15587.

* * * * *